(12) United States Patent
Verboekend et al.

(10) Patent No.: US 11,325,835 B2
(45) Date of Patent: May 10, 2022

(54) ZEOLITE AFTER TREATMENT METHOD

(71) Applicant: Katholieke Universiteit Leuven, Leuven (BE)

(72) Inventors: Danny Verboekend, Bertem (BE); Bert F. Sels, Westerlo (BE); Martin A. D'Halluin, Bertem (BE)

(73) Assignee: Katholieke Universiteit Leuven, Leuven (BE)

( * ) Notice: Subject to any disclaimer, the term of this patent is extended or adjusted under 35 U.S.C. 154(b) by 37 days.

(21) Appl. No.: 16/635,355

(22) PCT Filed: Jul. 31, 2018

(86) PCT No.: PCT/EP2018/070702
§ 371 (c)(1),
(2) Date: Jan. 30, 2020

(87) PCT Pub. No.: WO2019/025428
PCT Pub. Date: Feb. 7, 2019

(65) Prior Publication Data
US 2020/0165140 A1    May 28, 2020

(30) Foreign Application Priority Data

Jul. 31, 2017   (GB) .................................... 1712238
Aug. 29, 2017  (GB) .................................... 1713838
Aug. 31, 2017  (GB) .................................... 1714001
Sep. 1, 2017   (GB) .................................... 1714025

(51) Int. Cl.
*C01B 39/02*    (2006.01)
*C01B 39/24*    (2006.01)

(52) U.S. Cl.
CPC ............ *C01B 39/026* (2013.01); *C01B 39/24* (2013.01)

(58) Field of Classification Search
CPC .............................. C01B 39/026; C01B 39/24
See application file for complete search history.

(56) References Cited

U.S. PATENT DOCUMENTS

| | | | |
|---|---|---|---|
| 5,057,296 A | 10/1991 | Beck | |
| 5,102,643 A | 4/1992 | Kresge et al. | |
| 9,963,349 B2* | 5/2018 | Boorse | C01B 39/24 |
| 2014/0128246 A1 | 5/2014 | Garcia-Martinez | |

(Continued)

FOREIGN PATENT DOCUMENTS

WO    9507236 A1    3/1995

OTHER PUBLICATIONS

Li et al, "hierchical zeolite y with full crystallinity: formation mechanism and catalytic cracking performance", Energy Fuels, 31, 3804-3811 (Mar. 2017) (Year: 2017).*

(Continued)

*Primary Examiner* — Sheng H Davis
(74) *Attorney, Agent, or Firm* — Dinsmore & Shohl, LLP (57) ABSTRACT

This invention relates generally to a process to perform controlled alkaline and acid treatments on inorganic porous solids, yielding superior physico-chemical and catalytic properties, whereas the particle and crystal size is not negatively influenced. Accordingly, the solids obtained in this fashion can be easily recovered from the alkaline solution. The latter being problematic in the state of the art.

18 Claims, 1 Drawing Sheet

(56) References Cited

U.S. PATENT DOCUMENTS

2016/0167973 A1* 6/2016 Boorse .................. C01B 39/026
　　　　　　　　　　　　　　　　　　　　　　　　　423/700

OTHER PUBLICATIONS

Lutz et al., "Phase Transformations in Alkaline and Acid Leached Y Zeolites Dealuminated by Steaming", Z. Anorg. Allg. Chem, 626, pp. 1460-1467, 2000.

Wang et al., "Influence of Parent Type on Catalytic Performance of Hierarchial Y Prepared by Post-Treatment", Current Catalysis, 6, pp. 42-49, 2017.

International Search Report and Written Opinion pertaining to Application No. PCT/EP2018/070702 dated Oct. 23, 2018.

\* cited by examiner

ZEOLITE AFTER TREATMENT METHOD

This invention generally relates to a process to perform controlled sequential alkaline and acid treatments on inorganic porous solids, yielding superior physico-chemical and catalytic properties, while the particle and crystal size is not negatively influenced. Accordingly, the solids obtained in this fashion can be easily recovered from the alkaline solution.

BACKGROUND OF THE INVENTION

Zeolites are microporous aluminosilicate oxide structures that have well-defined pore structures due to a high degree of crystallinity. Crystalline aluminosilicate zeolites can have a natural and a synthetic origin. In the protonic form, the crystalline aluminosilicate zeolites are generally represented by the formula, $H_xAl_xSi_{1-x}O_2$, where "H" is a (exchangeable) proton that balances the electrovalence of the tetrahedra. The amount of exchangeable protons is referred to as the cation exchange capacity (CEC). The exact structure type of an aluminosilicate zeolite is generally identified by the particular silicon to aluminium molar ratio (Si/Al) and the pore dimensions of the cage structures. The size of the micropores (typically in the range of 0.4-1 nm) can be indicated with the number of T-atoms on the smallest diameter, the so called 'membered rings' (MRs). Using this definition, most common industrial zeolites feature micropores of 8 MRs, 10 MRs, or 12 MRs. The zeolite structure can also be made using, in addition to silica and alumina, phosphates, giving rise to the class of crystalline microporous silicoaluminophosphates (SAPOs). In addition, when silica is no longer present, crystalline microporous aluminophosphates (AlPOs) are formed. SAPOs and AlPOs possess, like zeolites, unique porous and acidic properties enabling them wide scale industrial application in catalysis, adsorption, and ion exchange.

Recently, hierarchical (mesoporous) zeolites, SAPOs, and AlPOs have attracted substantial attention because of their potential advantages in catalysis due to their high external surface area, reduced diffusion path lengths, and exposed active sites. The introduction of a secondary network of mesopores (typically in the range of 2-50 nm) leads to substantial changes in the properties of materials, which have an impact on the performance of zeolites in traditional application areas such as catalysis and separation. The number of accessible active sites increases rapidly with the enhanced porosity of the material. Additionally, the hierarchical zeolite crystals display reduced diffusion path lengths relative to conventional microporous zeolites, AlPOs, or SAPOs. Accordingly, these materials have attained superior performance in many catalytic reactions, such as cracking, alkylations, and isomerisations.

Hierarchical zeolites can be made using a wide variety of bottom-up and top-down procedures. Bottom-up procedures imply a change in the hydrothermal synthesis of the zeolites, for example by using organic templates or by lengthening the crystallization time. However, the most industrially attractive variant is the (top-down) post-synthetic modification of conventional commercially-available microporous zeolites. A key treatment in the latter category is the application of a base treatment, so called 'desilication'. This approach entails contacting zeolites in alkaline aqueous solutions, yielding hierarchical zeolites by removing part of the solid to give way to intra-crystalline or inter-crystalline mesopores. Base treatments enable to convert nearly any conventional zeolite into its superior hierarchical analogue. Also, for SAPOs and AlPOs, base treatments enable to yield a superior catalytic counterpart.

Besides the aim of mesopore formation, thereby producing hierarchical crystalline materials, alkaline treatments can also be performed to wash unwanted phases from bi-phasic materials. For example, NaOH leaching can be used to remove undesirable ZSM-5 impurities from ZSM-22 zeolites. In addition, base leaching can be used to selectively leach elements from materials comprising a wide variety of elements. For example, when applied on zeolites, base leaching is selective to silicon. Conversely, when applied to SAPOs, base leaching is mostly selective to phosphorus. Hereby, base treatments enable to tune, besides the (meso) porosity, other physico-chemical properties of the resulting material, such as the bulk composition, distribution of elements in the crystals, and acidity.

Base treatments are performed by directly adding the zeolite to an aqueous solution of base, typically at high pH (>12), hence high base concentration (for example >0.1 M NaOH), and letting the solid react with the base for typically 30 min. This procedure is followed by filtration, typically executed by Buchner filtration. For 10 MR zeolites, for example framework topologies such as MFI, FER, TON, the use of only an inorganic base (typically NaOH) in the alkaline treatment typically suffices. However, for 12 MR zeolites, such as zeolites with the FAU or BEA topology, the addition of organics, such as tetrapropylammonium bromide (TPABr) or diethylamine, to the alkaline solution may be required to maintain the intrinsic zeolite properties, such as crystallinity, acidity, and microporosity. SAPOs and AlPOs are in general more sensitive than zeolites, requiring the use of (inorganic) salt-free alkaline solutions prepared by amines or TPAOH to yield superior solids.

Alkaline (base) treatments are often performed as a single treatment within a sequence of post-synthetic modifications. For example, to prepare a catalytically-superior hierarchical Y zeolite, a sequence of 3 consequent acid-base-acid treatments can be performed. Alternatively, for clinoptilolite (natural zeolite), a sequence of 6 consecutive treatments (acid 4 times, base, acid) was reported. Additionally, for ZSM-5 and ZSM-22 two treatments (base-acid) were reported. Following each individual treatment a filtration and drying step are required. In general, the acid treatments result in the removal of Al (whereas base leaching usually results in the preferential leaching of Si), and their implications on zeolite are typically distinctly different compared to base treatment. For example, the acid treatment prior to the base treatment effectively removes aluminium from the zeolite framework, hereby enhancing the efficiency of the subsequent base treatment. Conversely, the acid treatment performed after the base treatment has been described as a mild acid wash, and is aimed predominantly at removing 'Al-debris' from the external surface. This Al debris has formed during the prior alkaline treatment. The efficiency of the acid wash is therefore closely tied to the efficiency of the prior alkaline treatment. The acid treatments executed prior and after the alkaline treatment are generally executed in a similar fashion compared to the alkaline treatment: the zeolite is directly added to an aqueous solution of acid, typically at low pH (<4), followed by filtration, typically executed by Buchner filtration. However, the influence of the acid is fundamentally different (removal of mostly Al instead of mostly Si for base). For example, acid treatments executed before or after alkaline treatment often consume substantially more time (typically 1 h or longer).

Besides the aforementioned advantages of the base leaching, it is imperative to highlight several severe disadvantages of base leaching. Firstly, the use of organics should be largely avoided, as they need to be removed by combustion. Not only does this process destruct the costly organics, the formed combustion products need to be carefully taken care of, which is a costly procedure in itself. Simple amines, such as diethylamine, used as base to leach 12 MR zeolites (beta and USY), AlPOs, and SAPOs, may be easily recovered due to their high volatility, enhancing its industrial appeal. However, the use of tetraalkylammonium cations (TAAs), such as TPABr and cetyltrimethylammonium bromide (CTABr), is preferably avoided as these are more costly, and they need to be removed by heat treatment giving rise to undesired streams such as $CO_2$, $NO_x$, $H_2O$, and/or explosive organics. It is therefore of eminent importance to reduce the use of organics, especially TAAs.

Secondly, base leached zeolites (with or without complementary acid treatments), even under reportedly optimal conditions with organic molecules, typically display strongly enhanced mesoporosities. However, more often than not, they also can display undesired reductions of zeolitic properties. Representative examples hereof are the crystallinity, Brønsted acidity, and microporosity. These reductions have been reported for most hierarchical or mesoporous zeolites prepared by alkaline treatment or sequential acid and alkaline treatments, as demonstrated in Table A of the example section.

An important recent development has been the realization that besides the amount of secondary porosity, the quality of the pore is of crucial importance too. It has been observed that, especially in high silica zeolites (Si/Al>ca. 10), base leaching may give rise to mesopores that are (partially) cavitated. In this case, the larger the cavitation, the smaller the catalytic benefits. Hence, at a constant mesopore surface or volume, the smallest possible degree of mesopore cavitation is desired.

Finally, base treatment can give rise to a pronounced reduction of the zeolite crystal size. This reduction is related to a fragmentation which may give rise to fragments in the size range of 5-100 nm. These represent colloidally-stable particles that are very hard to separate using conventional filtration techniques over porous filter membranes, and require the use of costly industrial separation techniques, such as high-speed commercial centrifuges. Accordingly, the zeolite suspensions after base leaching are often extremely hard to filter, as demonstrated in Table A of the example section.

Hence, it is desirable to provide a more efficient process, that yields the same effect (enhanced mesoporosity), but yields solids comprising higher intrinsic zeolitic properties, a reduced degree of cavitation, a reduced amount of organic supplements, and/or preserved crystal size. In addition, such superior process preferably features a similar or reduction of the number of steps involved, the overall process time, and the amount of formed waste water. The obtained materials may have improved properties for the preparation of technical catalysts, or for use in catalysis, adsorptive or ion exchange processes.

SUMMARY OF THE INVENTION

In accordance with the purpose of the invention, as embodied and broadly described herein, the invention is broadly drawn to a process to perform sequential acid and alkaline treatment on inorganic porous solids yielding superior physico-chemical (zeolitic) and catalytic properties. These superior properties may the combination of an enhanced mesoporosity with a higher Brønsted acidity, a higher microporosity, a higher mesoporosity, a higher crystallinity, and/or combinations hereof.

In an aspect, the invention relates to a method for preparing a treated inorganic porous solid, wherein the method comprises at least two separate treatments (z) which are separated by a solid separation step, such as a filtration step, wherein at least one of the z treatments comprises the steps of:
a) providing an inorganic porous solid, at an amount of $m_s$;
b) providing a total amount of base $m_{b,total}$; and,
c) contacting and reacting the inorganic porous solid with an amount of base $m_b(t)$ in a solution over a time frame $\Delta t$ for the total amount of base $m_{b,total}$;
thereby obtaining a treated inorganic porous solid;
wherein the maximum amount of base $m_{b,max}$ of $m_b(t)$ brought into contact with inorganic porous solid $m_s$ at any given time t in step c) is smaller than $m_{b,total}/m_s$;
and wherein at least one of the z treatments comprises the steps of:
d) providing an inorganic porous solid, at an amount of $m_s$;
e) providing a total amount of base $m_{a,total}$; and,
f) contacting and reacting the inorganic porous solid with an amount of acid $m_a(t)$ in a solution over a time frame $\Delta t$ for the total amount of base $m_{a,total}$;
thereby obtaining a treated inorganic porous solid;
wherein the maximum amount of base $m_{a,max}$ of $m_a(t)$ brought into contact with inorganic porous solid $m_s$ at any given time t in step f) is smaller than $m_{a,total}/m_s$.

The total amount of base can be provided in the form of a solid alkali or an alkaline solution, preferably an alkaline solution. Similarly, the total amount of acid can be provided in the form of a solid acid or an acidic solution.

In some preferred embodiments, the maximum amount of base $m_{b,max}$ of $m_b(t)$ at any given time t in step c) is at most $0.50*m_{b,total}$, preferably at most $0.25*m_{b,total}$, preferably at most $0.10*m_{b,total}$.

In some preferred embodiments, the maximum amount of acid $m_{a,max}$ of $m_a(t)$ at any given time t in step f) is at most $0.25*m_{a,total}$, preferably at most $0.10*m_{a,total}$, preferably at most $0.05*m_{a,total}$.

In some preferred embodiments, the inorganic porous solid comprises a molecular sieve, such as a zeolite or SAPO.

In some preferred embodiments, step a) comprises:
a') providing the inorganic porous solid at an amount of $m_s$ suspended in a suspension, preferably in water;
and step d) comprises:
d') providing the inorganic porous solid at an amount of $m_s$ suspended in a suspension, preferably in water;

In some preferred embodiments, the method comprises a base treatment featuring a number of base additions per treatment (x) which are not separated by a solid separation step, such as a filtration step, and an amount of base added per addition ($m_b$,i with i=1 . . . x), characterised in that x is not equal to 0, preferably wherein x is at least 2, preferably at least 3, preferably at least 4.

In some preferred embodiments, the method comprises an acid treatment featuring a number of acid additions per treatment (x) which are not separated by a solid separation step, such as a filtration step, and an amount of base added per addition ($m_a$,i with i=1 . . . x), characterised in that x is not equal to 1, preferably wherein x is at least 2, preferably at least 3, preferably at least 4.

In some preferred embodiments, z is 2, wherein an acid treatment is followed by a base treatment.

In some preferred embodiments, z is 2, wherein a base treatment is followed by an acid treatment.

In some preferred embodiments, z is 3, wherein a base treatment is executed after an acid treatment, and followed by another separate acid treatment.

In some preferred embodiments, the rate of adding the amount of base over time is at most 3.0 mmol g$^{-1}$ min$^{-1}$, preferably at most 1.0 mmol g$^{-1}$ min$^{-1}$, preferably at most 0.5 mmol g$^{-1}$ min$^{-1}$. In some preferred embodiments, the base is continuously added to the inorganic porous solid during a time frame Δt, wherein the time frame Δt for adding the total amount of base $m_{b,total}$ is at least 15 s.

In some preferred embodiments, the rate of adding the amount of acid over time is at most 1.0 mmol g$^{-1}$ min$^{-1}$, preferably at most 0.1 mmol g$^{-1}$ min$^{-1}$, preferably at most 0.01 mmol g$^{-1}$ min$^{-1}$. In some preferred embodiments, the acid is continuously added to the inorganic porous solid during a time frame Δt, wherein the time frame Δt for adding the total amount of base $m_{a,total}$ is at least 15 min.

In an aspect, the invention relates to a treated inorganic porous solid obtainable by the method according to any one of the aspects and embodiments described herein.

In an aspect, the invention relates to a zeolite with the faujasite topology, preferably prepared according to the method according to any one of the aspects and embodiments described herein, with a unit cell size ranging from 24.375 Å to 24.300 Å with a mesopore volume of at least 0.30 ml/g and one or more of the following features:
   a Brønsted acidity of at least 450 μmol g$^{-1}$, as measured with pyridine;
   a crystallinity of at least 75% relative to a standard NaY zeolite, and at least 90% compared to NIST standard alumina (SRM 676).

In an aspect, the invention relates to a zeolite with the faujasite topology, preferably prepared according to the method according to any one of the aspects and embodiments described herein, with a unit cell size from 24.60 Å to 24.40 Å, with a bulk atomic Si/Al ratio exceeding 7.5 with a mesopore volume of at least 0.30 ml/g and a micropore volume of at least 0.20 ml/g.

In an aspect, the invention relates to a method for preparing a technical catalyst, the method comprising the steps of:
   preparing a treated inorganic porous solid according to any one of the aspects and embodiments described herein, or providing a porous solid according to any one of the aspects and embodiments described herein;
   adding one or more additional ingredients to form a mixture, preferably wherein the one or more additional ingredients are selected from the group comprising: fillers, pyrogens, binders, lubricants, and combinations thereof; and
   shaping the mixture into a macroscopic form to obtain a technical catalyst, preferably wherein the macroscopic form has a minimal dimension from at least 1 μm to at most 10 cm.

In an aspect, the invention relates to the use of a treated inorganic porous solid according to any one of the aspects and embodiments described herein, in catalysis, adsorptive or ion exchange processes.

BRIEF DESCRIPTION OF THE DRAWINGS

The present invention will become more fully understood from the detailed description given herein below and the accompanying drawings which are given by way of illustration only, and thus are not limitative of the present invention, and wherein:

In FIG. 1, however, there are multiple additions during each separate treatment. In FIG. 1, x represents the number of base or acid additions per reaction, $m_b$ and $m_a$ the amount of base or acid added per addition, respectively, y the number of solid additions per reaction (always equal to 1), and ($m_s$) the amount of solid added per addition, and z represents the number of treatments. In the state of the art, per treatment, x and y are equal to 1. In the further embodiments in this detailed description, y and $m_s$ are not modified. In the invention x is not equal to one (preferably x≥2) for at least two separate consecutive treatments (z≥2), in which at least one treatment constitutes an alkaline treatment, and in which at least one treatment constitutes an acid treatment.

DETAILED DESCRIPTION OF EMBODIMENTS OF THE INVENTION

The following terms are provided solely to aid in the understanding of the invention.

The term "room temperature" as used in this application means a temperature in the range of 12 to 30 deg. C., preferably in the range of 16 to 28 deg. C., more preferably in the range of 17 to 25 deg. C. and most preferably is roughly 20 to 23 deg. C.

The term "molecular sieve" as used herein refers to a solid with pores the size of molecules. It includes but is not limited to microporous and mesoporous materials, AlPOs and (synthetic) zeolites, pillared or non-pillared clays, clathrasils, clathrates, carbon molecular sieves, mesoporous silica, silica-alumina (for example, of the MCM-41-type, with an ordered pore system), microporous titanosilicates such as ETS-10, urea and related host substances, porous metal oxides. Molecular sieves can have multimodal pore size distribution, also referred to as ordered ultramicropores (typically less than 0.7 nm), supermicropores (typically in the range of about 0.7-2 nm) or mesopores (typically in the range of about 2 nm-50 nm). A particular type of molecular sieve envisaged within the present invention are the silica molecular sieves, more particularly silica zeogrids, zeolites, and/or amorphous microporous silica materials. Among solid substances known thus far, those having uniform channels, such as zeolites represented by porous crystalline aluminium silicates and porous crystalline aluminium phosphates (AlPO) are defined as molecular sieves, because they selectively adsorb molecules smaller than the size of the channel entrance or they allow molecules to pass through the channel. In view of crystallography, zeolites are fully crystalline substances, in which atoms and channels are arranged in complete regularity. These fully crystalline molecular sieves are obtained naturally or synthesized through hydrothermal reactions. The number of fully crystalline molecular sieves obtained or synthesized thus far amounts to several hundreds of species. They play an important role as catalysts or supports in modern chemical industries by virtue of their characteristics including selective adsorption, acidity and ion exchangeability. Molecular sieves, both natural and synthetic, include a wide variety of positive ion-containing crystalline silicates. These silicates can be described as a rigid three-dimensional framework of $SiO_4$ and Periodic Table Group 13 element oxide, e.g. $AlO_4$, in which tetrahedra are crosslinked by the sharing of oxygen atoms whereby the ratio of the total Group 13 and Group 14, e.g. silicon, atoms to oxygen atoms is 1:2. Crystalline microporous silicon dioxide polymorphs represent compositional end members of these compositional material families. These silica molecular sieves do not have cation exchange capacity.

A "zeolite" can be defined as a crystalline material of which the chemical composition includes essentially aluminium, silicon and oxygen. Typically, zeolites are described as aluminosilicates with a three dimensional framework and molecular sized pores. Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or windows. These cavities and pores are uniform in size within a specific zeolite material. Since the dimensions of these pores are such as to accept for adsorption molecules of certain dimensions while rejecting those of larger dimensions, these materials are known as "molecular sieves" and are utilized in a variety of ways to take advantage of these properties. The term zeolite, as used in disclosing the present invention, can also mean means any member of a group, of structured aluminosilicate minerals comprising cations such as sodium and calcium or, less commonly, barium, beryllium, lithium, potassium, magnesium and strontium; characterized by the equation, $H_xAl_xSi_{1-x}O_2$, where H can be replaced by any other univalent cation, or (when the x related to H is divided by the valence) a multivalent cation. The term zeolite also refers to an open tetrahedral framework structure capable of ion exchange, and loosely held water molecules, that allow reversible dehydration. The term "zeolite" also includes "zeolite-related materials" or "zeo-types" which are prepared by replacing $Si^{4+}$ or $Al^{3+}$ with other elements as in the case of aluminophosphates (e.g., MeAPO, SAPO, EIAPO, MeAPSO, and EIAPSO), gallophosphates, zincophosphates, titanosilicates, etc. The zeolite can be a crystalline porous material with a frame work as described in US2013/0118954 or provided in the Zeolite Framework Types database of the IZA structure commission where under the following structure types (from which also the framework density can be derived), as defined by the International Zeolite Association such as ABW type, ACO type, AEI type, AEL type, AEN type, AET type, AFG AFI type, AFN type, AFO type, AFR type, AFS type, AFT type, AFX type, AFY type, AHT type, ANA type, APC type, APD type, AST type, ASV type, ATN type, ATO type, ATS type, ATT type, ATV type, AWO type, AWW type, BCT type, BEA type, BEC type, BIK type, BOG type, BPH type, BRE type, CAN type, CAS type, CDO type, CFI type, CGF type, CGS type, CHA type, CHI type, CLO type, CON type, CZP type, DAC type, DDR type, DFO type, DFT type, DOH type, DON type, EAB type, EDI type, EMT type, EON type, EPI type, ERI type, ESV type, ETR type, EUO type, EZT type, FAR type, FAU type, FER type, FRA type, GIS type, GIU type, GME type, GON type, GOO type, HEU type, IFR type, IHW type, IMF type, ISV type, ITE type, ITH type, ITW type, IWR type, IWV type, IWW type, JBW type, KFI type, LAU type, LEV type, LIO type, LIT type, LOS type, LOV type, LTA type, LTL type, LTN type, MAR type, MAZ type, MEI type, MEL type, MEP type, MER type, MFI type, MFS type, MON type, MOR type, MOZ type, MSE type, MSO type, MTF type, MTN type, MTT type, MTW type, MWW type, NAB type, NAT type, NES type, NON type, NPO type, NSI type, OBW type, OFF type, OSI type, OSO type, OWE type, PAR type, PAU type, PHI type, PON type, RHO type, RON type, RRO type, RSN type, RTE type, RTH type, RUT type, RWR type, RWY type, SAO type, SAS type, SAT type, SAV type, SBE type, SBN type, SBS type, SBT type, SFE type, SFF type, SFG type, SFH type, SFN type, SFO type, SGT type, SIV type, SOD type, SOS type, SSF type, SSY type, STF type, STI type, STO type, STT type, SZR type, TER type, THO type, TOL type, TON type, TSC type, TUN type, UEI type, UFI type, UOZ type, USI type, UTL type, VET type, VFI type, VNI type, VSV type, WEI type, WEN type, YUG type and ZON type. The term "zeolite" also includes "zeolite-related materials" or "zeo-types" which are prepared by replacing Si4+ or Al3+ with other elements as in the case of aluminophosphates (e.g., MeAPO, AlPO, SAPO, EIAPO, MeAPSO, and EIAPSO), gallophosphates, zincophosphates, titanosilicates, etc. Generally, porous substances are divided by pore size, for example, pore sizes smaller than 2 nm classified as microporous substances, between 2 and 50 nm classified as mesoporous substances and larger than 50 nm classified as macroporous substances. Non-zeolitic mesoporous silicas, such as MCM-41 and SBA-15, can display substantial microporosity. This type of microporosity is however 'non-ordered' and not well-defined, and should not be considered zeolitic. The microporosity as defined within the embodiments of this contribution is derived primarily from the zeolitic micropores related to the framework topologies. For example, for the USY zeolites with faujasite topology the microporosity is derived from the well-defined 0.74 nm micropores, for zeolite beta with BEA topology the microporosity stems from the well-defined 0.6 nm pores, and for zeolite ZSM-5 with MFI topology the microporosity stems from the well-defined 0.55 nm pores. Of the porous substances, those having uniform channels, such as zeolite, are defined as molecular sieves. Up to hundreds of types of species have been found and synthesised thus far. Zeolites play an important role as catalysts or carriers in modern chemical industries by virtue of their characteristics including selective adsorptivity, acidity and ion exchangeability.

A series of ordered mesoporous materials, including MCM-41 and MCM-48, was reported in U.S. Pat. Nos. 5,057,296 and 5,102,643. These ordered materials show a structure in which mesopores uniform in size are arranged regularly. MCM-41, has a uniform structure exhibiting hexagonal arrangement of straight mesopores, such as honeycomb, and has a specific surface area of about 1000 $m^2/g$ as measured by the BET method (using nitrogen adsorption). Existing molecular sieves have been produced by using inorganic or organic cations as templates, whereas those ordered mesoporous materials are synthesized through a liquid crystal template pathway by using surfactants as templates. These ordered mesoporous materials have the advantage that their pore sizes can be adjusted in a range of 1.6 nm to 10 nm by controlling the kinds of surfactants or synthesis conditions employed during the production process. Ordered mesoporous materials designated as SBA-1, -2 and 3 were reported in Science (1995) 268:1324. Their channels are regularly arranged, while the constituent atoms show an arrangement similar to that of amorphous silica. Ordered mesoporous materials have regularly arranged channels larger than those of existing zeolites, thus enabling their application to adsorption, isolation or catalytic conversion reactions of relatively large molecules.

In general, the present invention concerns a process to prepare unique inorganic solids by application of sequences of controlled acid and alkaline treatments to existing inorganic porous solids, for instance crystalline solid particles, without a negative influence on the particle or crystal size, and to obtain an end product of solids with superior physicochemical and catalytic properties. The process of the present invention may yield solids which are easily recovered from the alkaline solution after treatment. In a particular embodiment the process comprises the use of sequences of acid and base treatments, in which each treatment comprises the stepwise contacting of the base or acid to the porous solid, hereby attaining superior physico-chemical properties. In addition to the superior physico-chemical properties, superior catalytic properties, and the enhanced filtration behaviour, this invention may enable to reduce the amount of organics which are often used to preserve the microporosity, crystallinity, and acidity during alkaline or acid leaching.

As used herein, the term "Al in the framework" refers to tetrahedral coordinated Al. The properties of the solids may be assessed using nitrogen adsorption at 77 K as it is a well-established technique to quantify the intrinsic zeotypical properties (relevant for crystalline microporous solids), as well as the amount of mesoporous in the solids. A descriptor that is derived from the nitrogen isotherm is the total surface area ($S_{BET}$). The latter is obtained by application of the BET model, and gives an indication of the overall porosity (micropores and mesopores) of the solids. The intrinsic zeotypical properties can be examined using the microporosity ($V_{micro}$), which is derived from application of the t-plot to the adsorption branch of the isotherm, preferably applied within the range 0.35-0.50 nm thickness. Since the active sites (Brønsted sites, described below) are located in the micropores, it is preferred that upon post-synthetic modification using acid and base treatments the micropore volume remains as close to the starting zeolite as possible. Nitrogen-sorption measurements were executed using a Micromeritics TriStar 3000 instrument, controlled by TriStar 3000 software (Micromeritics) version 6.03. Prior to the sorption experiment, the samples were degassed overnight under a flow of $N_2$ with heating to 300° C. (5° C. min$^{-1}$). The t-plot method, as described in Microporous Mesoporous Mater. 2003, 60, 1-17, was used to distinguish between micro- and mesopores (thickness range=0.35-0.50 nm, using thickness equation from Harkins and Jura, and density conversion factor=0.0015468). To accurately compare the microporosity derived from the t-plot among solids, it is preferred that the same t-plot method and thickness range and thickness equation are used. For example, if the t-plot is applied in a narrow range at high relative pressures (for example at p/p$_0$=0.30-0.35) the resulting microporosity can be an overestimation. The t-plot method simultaneously yields an external surface (referred to '$S_{meso}$') which is used as an indication for the degree of secondary porosity. The total pore volume ($V_{pore}$) was determined at relative pressure (p/p$_0$=0.98). The mesopore volume ($V_{meso}$) is defined as $V_{meso}=V_{pore}-V_{micro}$.

In the case the inorganic porous solids are crystalline, zeolites, SAPOs, AlPOs, the preservation of the intrinsic properties can be examined using X-ray diffraction (XRD). This technique results in a topology-specific reflection pattern. The relative crystallinity, indicative for the overall intrinsic zeotypical properties, can be assessed by integration of several characteristic peaks using methods such as described in ASTM D3906 (for faujasite zeolites) ASTM 5758 (for ZSM-5 zeolites), ASTM WK9245 (for mordenite zeolites), and ASTM D5357 (for NaA zeolites). It is preferred that the acid- and alkaline-treated sample displays a crystallinity as high as possible relative to the starting crystallinity inorganic solid. In the case of faujasites the relative crystallinity is compared to industrial standard NaY zeolite provided by Zeolyst (supplier code 'CBV 100'). In addition, the relative crystallinities of the zeolites are quantified by comparison to a NIST standard alumina (SRM 676). This is achieved by comparing the area of the peak at 25.7 degrees 2theta of the NIST standard to the area of the peak at 15.7 degrees 2theta for zeolites with FAU topology, or to the area of the peak at 7.7 degrees 2theta for zeolites with the BEA topology, or the area of the peaks in the range from 23.1 to 24.3 degrees 2theta for ZSM-5 zeolites. XRD is also a useful characterization technique as it enables to determine the unit cell size. Particularly in the case of faujasites, the unit cell size is relevant as it gives an indication of the composition (atomic Si/Al ratio) of the framework. The unit cell size is derived using established methods as specified in ASTM 3942. X-Ray diffraction was measured on a Siemens D5000 diffractometer with Bragg-Brentano geometry and Ni-filtered Cu Kα radiation (λ=0.1541 nm). Data were recorded in the range 5-50 degrees 2theta with an angular step size of 0.05 degrees and a counting time of 8 s per step.

The majority of applications of the inorganic porous solids described herein comprise acid-catalysed conversions. Herein, the acid-site type and quantity is crucial. To quantitatively monitor the acidic properties of solids, a routinely-applied technique is the Fourier-transform infrared (FTIR) spectroscopy of pyridine adsorbed onto the solids. This method enables to quantify the number of strong Brønsted sites (B) and weaker Lewis acid sites (L) present within the solid. In catalytic applications of zeolites and SAPOs, particularly the amount of Brønsted acid sites is key to their effective operation. Although the main goal of the modification by combinations of alkaline and acid treatments is often porous enhancement, it is imperative that particularly the Brønsted site density is maintained upon the latter post-synthetic modifications.

Pyridine FTIR measurements were performed by using a Nicolet 6700 spectrometer equipped with a DTGS detector. Samples were pressed into self-supporting wafers and degassed at 400° C. for 1 h in vacuo before measurements. After evacuation, the samples were subjected to 4-5 pulses of at least 25 mbar of pyridine at 50° C. for 1 min (until saturation), after which the system was heated to 150° C. in 40 min, followed by the acquisition of the spectra at the same temperature. The absorption bands at 1550 and 1450 cm$^{-1}$ corresponded to the amount of Brønsted and Lewis acid sites, respectively. The used extinction coefficients were determined by Emeis, J. Catal. 1993, 141, 347-354.

The catalytic performance was monitored in the isomerization of α-pinene, as it represents a suitable model reaction in which both the function of the intrinsic zeotypical properties and that of the external surface is probed. In this reaction the activity (A) refers to the degree of conversion, while the productivity (P) is the yield of useful products (limonene, camphene, α-terpinene, γ-terpinene, terpinoline, p-cymene).

Experimental catalysis: The α-pinene isomerization reactions were carried out in a 50 cm$^3$ Parr reactor with a sampling device at 150° C. under 6-8 bar of nitrogen with a stirring speed of 750 rpm. A mixture of substrate (20 g; α-pinene) and catalyst (0.05 g) was heated to 100° C., after which time the first liquid sample was taken. The reaction mixture was then further heated to 150° C. and more samples were taken 10, 30, and 60 min after the first sample.

The samples were then analysed on a gas chromatograph (HP 5890, Hewlett Packard) equipped with an HP1 column and a flame ionization detector (FID). Tetradecane was used as an external standard. Unidentified products were analysed by GCMS (6890N, Agilent Technologies). The activity of the samples was determined by using the slope of the linear part of the conversion of a-pinene versus the contact time graph.

Alkylations of toluene with benzyl alcohol were performed by mixing 0.0125 g of catalyst with 4.98 ml (47 mmol) toluene (Fisher), 0.062 ml (0.6 mmol) benzyl alcohol (Sigma Aldrich) and 0.048 ml (0.3 mmol) propyl cyclohexane (TCI Europe) as internal standard. The catalyst powder was pre-dried for 2 h at 300° C. (ramp 5° C. $min^{-1}$) and the reaction was carried out in closed Schott bottles (Duran) for 1 h under stirring at 120° C. The reaction mixture was analyzed with gas chromatography (Agilent 6850 series).

According to a first aspect, the invention relates to a method for preparing a treated inorganic porous solid wherein the method comprises at least two separate treatments (z≥2) which are separated by a solid separation step, such as a filtration step, at least one of the z treatments comprising the steps of:

a) providing an inorganic porous solid, at an amount of $m_s$;

b) providing a total amount of base $m_{b,total}$; and, c) contacting and reacting the inorganic porous solid with an amount of base $m_b(t)$ over a time frame $\Delta t$ for the total amount of base $m_{b,total}$; thereby obtaining a treated inorganic porous solid;

and at least one of the z treatments comprising the steps of:

d) providing an inorganic porous solid, at an amount of $m_s$;

e) providing a total amount of $m_{a,total}$; and f) contacting and reacting the inorganic porous solid with an amount of acid $m_a(t)$ over a time frame $\Delta t$ for the total amount of acid $m_{a,total}$; thereby obtaining a treated inorganic porous solid;

wherein the maximum amount of base $m_{b,max}$ of $m_b(t)$ brought into contact with inorganic porous solid $m_s$ at any given time t in step c) is smaller than $m_{b,total}/m_s$, and wherein the maximum amount of acid $m_{a,max}$ of $m_a(t)$ brought into contact with inorganic porous solid $m_s$ at any given time t in step f) is smaller than $m_{a,total}/m_s$.

The total amount of base can be provided in the form of a solid alkali or an alkaline solution, preferably an alkaline solution. Similarly, the total amount of acid can be provided in the form of a solid acid or an acidic solution.

In some embodiments, the process comprises the stepwise contacting of the solid to the base of acid per treatment, hereby largely preventing fragmentation. As a result, particle and crystal pore sizes may be obtained which are similar to the starting solid. In addition to the superior physicochemical properties, superior catalytic properties, and the enhanced filtration behaviour, this invention enables to reduce the amount of organics required in order to preserve the microporosity and crystallinity during the alkaline leaching.

In some preferred embodiments, the maximum amount of base $m_{b,max}$ of $m_b(t)$ at any given time t in step c) is at most $0.5*m_{b,total}$, preferably at most $0.25*m_{b,total}$, preferably at most $0.10*m_{b,total}$.

In some preferred embodiments, the maximum amount of acid $m_{a,max}$ of $m_a(t)$ at any given time t in step f) is at most $0.5*m_{a,total}$, preferably at most $0.25*m_{a,total}$, preferably at most $0.10*m_{a,total}$.

In some preferred embodiments, the inorganic porous solid comprises a molecular sieve, such as a zeolite or SAPO.

In some embodiments, the inorganic porous solid is a zeolitic material, preferably of structure type MWW, BEA, MFI, CHA, MOR, MTW, RUB, LEV, FER, MEL, RTH AEL, AFI, CHA, DON, EMT, CFI, CLO, TON, FER, ERI, MEL, MTW, MWW, HEU, EUO, RHO, LTL, LTA, MAZ, and most preferably to MOR, MFI, BEA, FAU topology, this zeolitic material having a mesoporosity after the treatment. This method or process can start from crystalline silicates, in particular those having zeolitic structure, which are subjected to the acid and alkaline treatments and the new material with zeolitic properties and with mesoporosity is obtainable without high-speed commercial centrifuges or omitting filtration steps in between sequences of treatments. These zeolitic materials with mesoporosity may thereby be prepared in an ecologically and economically advantageous manner.

In some embodiments, this method or process can start from an amorphous silicate, such as fumed silica, and/or ordered silicas such as MCM-41 or SBA-15.

In some preferred embodiments, step a) comprises:

a') providing the inorganic porous solid at an amount of $m_s$ suspended in a solution, preferably in water;

and step d) comprises d') providing the inorganic porous solid at an amount of $m_s$ suspended in a solution, preferably in water.

The preferred solvent for the alkaline treatment (step c) is water. In some embodiments, other solvents are used, such as alcohols (methanol, ethanol, or isopropanol). Typical solutions to execute the base treatment are in water with pH varying from at least 10 to at most 14, which relates to concentrations of NaOH of 0.0001 M to 1 M. The solid-to-liquid ratio (inorganic porous solid to liquid of base) can vary from very low 1 g $L^{-1}$ to very high 100 g $L^{-1}$, but in the examples is typically chosen to be typically 33 g $L^{-1}$. The temperature may range from at least room temperature to at most 100° C., preferably from at least 50° C. to at most 70° C.

The preferred bases to make the alkaline solution are inorganic hydroxides such as NaOH, LiOH, KOH, RbOH, CsOH, $Mg(OH)_2$, $Ca(OH)_2$, $Sr(OH)_2$, or $Ba(OH)_2$. In some embodiments, inorganic non-hydroxides alkaline sources can be used such as $Na_2CO_3$, $NH_3$, butyl lithium (n-$C_4H_9Li$), and sodium hydride (NaH). In other embodiments, organic bases can be used, such as tetrapropylammonium hydroxide, diethylamine, dipropylamine, tetrabutylammonium hydroxide and tetraethylammonium hydroxide.

The preferred solvent for the acid treatment (steps f) is water. Typical solutions to execute the acid treatment are in water with pH varying from 0 to 5, which relates to concentrations of HCl of 1 M to 0.00001 M. The solid-to-liquid ratio (inorganic porous solid to liquid of acid) can vary from very low 1 g $L^{-1}$ to very high 100 g $L^{-1}$, but in the examples is typically chosen to be typically 66 g $L^{-1}$. The temperature may range from at least room temperature to at most 100° C., preferably at least 70° C. The preferred acids to make the acidic solutions are mineral acids from the group of HCl, $HNO_3$, $H_2SO_4$, $H_3PO_4$, $H_3BO_3$. In some embodiments, organic acids from the group of sulphonic acids such as methanesulfonic acid, ethanesulfonic acid, benzenesulfonic acid, and p-toluenesulfonic acid, may be used. In some embodiments, organic acids from the group of carboxylic acids such as acetic acid, citric acid, formic acid, gluconic acid, lactic acid, oxalic acid, tartaric acid may be used. In another embodiment, organic acids from the group of aminopolycarboxylic acids, such as ethylenediaminetetraacetic acid (EDTA), Iminodiacetic acid (IDA), and 1,4,7,10-tetraazacyclododecane-1,4,7,10-tetraacetic acid (DOTA), may be used. In other embodiments, only part of the carboxylic groups in the organic acids may be in the protonic (acidic) form such as $Na_2H_2EDTA$.

In some embodiments, the base is added in multiple discrete steps. The inorganic porous solid is not separated in between these steps. In some preferred embodiments, the method comprises a number of base additions per treatment (x) which are not separated by a solid separation step, and an amount of base added per addition ($m_b$,i with i=1 . . . x), characterised in that x is not equal to 1, preferably wherein x is at least 2, preferably at least 3, preferably at least 4.

In some embodiments, the acid is added in multiple discrete steps. The inorganic porous solid is not separated in between these steps. In some preferred embodiments, the method comprises a number of acid additions per treatment (x) which are not separated by a solid separation step, and an amount of acid added per addition ($m_b$,i with i=1 . . . x), characterised in that x is not equal to 1, preferably wherein x is at least 2, preferably at least 3, preferably at least 4.

In some preferred embodiments, z is 2 and comprises one acid and one base treatment. This means that two separate treatments are executed, each followed by a solid separation step, preferably a filtration step. During one of these treatments, the base is added in multiple steps (x≠1), or gradually. During the other of the two treatments, the acid is added in multiple steps (x≠1), or gradually. The order of executing the acid and base treatment may be in the case of z=2 either base-acid and acid-base.

In some preferred embodiments, z is 3 and comprises two acid and one base treatment. This means that three separate treatments are executed, each followed by a solid separation step, preferably a filtration step. During one of these treatments, the base is added in multiple steps (x≠1), or gradually. During the other two treatments, the acid is added in multiple steps (x≠1), or gradually. The order of executing these three treatments is preferentially in the case of z=3 acid-base-acid.

In some embodiments, the base is added gradually or continuously. The inorganic porous solid is not separated during this gradual addition. In some preferred embodiments, the rate of adding the amount of base over time is at most 3.0 mmol $g^{-1}$ $min^{-1}$, preferably at most 1.0 mmol $g^{-1}$ $min^{-1}$, preferably at most 0.5 mmol $g^{-1}$ $min^{-1}$.

The rate of adding the amount of base over time may depend on the used treatment. However, very good solids can be obtained by keeping this value below 3.0 mmol of base per gram of zeolite per minute (mmol $g^{-1}$ $min^{-1}$), preferably below 1.0 mmol $g^{-1}$ $min^{-1}$, and most preferably below 0.5 mmol $g^{-1}$ $min^{-1}$.

In some embodiments, the base is continuously added to the inorganic porous solid during a time frame Δt, wherein the time frame Δt for adding the total amount of base $m_{b,total}$ is at least 15 s, preferably at least 30 s, for example at least 60 s, for example at least 2 min, for example at least 4 min, for example at least 8 min, for example at least 15 min, for example about 30 min. In some embodiments, Δt is at least 8 min and at most 60 min, preferably at least 15 min and at most 45 min, for example about 30 min.

In some embodiments, the acid is added gradually or continuously. The inorganic porous solid is not separated during this gradual addition. In some preferred embodiments, the rate of adding the amount of acid over time is at most 1.0 mmol $g^{-1}$ $min^{-1}$, preferably at most 0.1 mmol $g^{-1}$ $min^{-1}$, preferably at most 0.01 mmol $g^{-1}$ $min^{-1}$.

The rate of adding the amount of acid over time may depend on the used treatment. However, very good solids can be obtained by keeping this value below 1.0 mmol of acid per gram of zeolite per minute (mmol $g^{-1}$ $min^{-1}$), preferably below 0.1 mmol $g^{-1}$ $min^{-1}$, and most preferably below 0.01 mmol $g^{-1}$ $min^{-1}$.

In some preferred embodiments, the acid is continuously added to the inorganic porous solid during a time frame Δt, wherein the time frame Δt for adding the total amount of acid $m_{a,total}$ is at least 15 min, preferably at least 30 min, for example at least 60 min, for example at least 4 hour, for example at least 8 hour, for example at least 16 hour, for example at least 36 hour, for example about 72 hour. In some embodiments, Δt is at least 2 hour and at most 12 hour, preferably at least 3 hour and at most 9 hour, for example about 6 hour.

In some embodiments, additives can be added, like the base in above-described fashion, in similar gradual fashion. Such additives can be common salts such as NaCl and KBr, as well as metal salts, such as $Al(NO_3)_3$ and $Ga(NO_3)_3$, and organic compounds such as TPABr and DEA.

The impact of the invention, as compared to the state of the art, may depend on the nature of the samples. Among others, the largest influence may be the density of the zeolite's framework topology. In this case, a lower topological density yields a larger advantage. Therefore, the benefits on the zeolites with the FAU framework (density 13.3 T-atoms/1000 $Å^3$), are larger compared to those obtained on zeolites with BEA framework (density 15.3 T-atoms/1000 $Å^3$). Similarly, the benefits on BEA may therefore be larger compared to zeolites of the MFI framework (18.4 T-atoms/1000 $Å^3$). The framework densities relate to the all-silica framework density ($FD_{Si}$) and can be found on the IZA database (http://www.iza-structure.org/databases/).

In addition, in the case of zeolites, the Si/Al ratio in the framework (and bulk) may have an influence. For example, in the case of preventing fragmentation and associated prolonged filtration times during the alkaline treatment, the effect is optimal when the atomic Si/Al ratio is 5 or higher, preferably 10 or 25 higher, and most preferably 20 and higher. This is demonstrated in Table A, where the filtration time of alkaline-treated USY zeolites increases rapidly with an increase of the Si/Al ratio of the starting zeolite.

In some embodiments, the invention comprises a process to perform sequential acid and alkaline treatments on inorganic porous solids yielding superior physico-chemical and catalytic properties, without a negative influence (or with only a limited influence) on the particle or crystal size. The application of the invention yields solids which may be easily recovered from the alkaline solution after treatment. In some embodiments, the process comprises the stepwise contacting of the solid to the base, hereby largely preventing fragmentation. As a result, particle and crystal pore sizes are obtained which are similar to the starting solid. In addition to the superior physico-chemical properties, superior catalytic properties, and the enhanced filtration behaviour, this invention enables to reduce the amount of organics required in order to preserve the microporosity and crystallinity during the alkaline leaching.

As illustrated by various examples, the inventive process can performed by at least two treatments featuring at least one acid and base treatment, in which during each treatment the solid is exposed to a lower acidity (during acid treatment) of lower alkalinity (during a base treatment), by dosing the base or acid stepwise during the alkaline and acid treatment, respectively, or by pumping a dilute alkaline or acidic solution through a solid-containing membrane. After such treatments, porous solids of superior physico-chemical properties may be obtained and filtration time may be reduced substantially, thereby enhancing the overall productivity of the leaching process.

Figure 1:
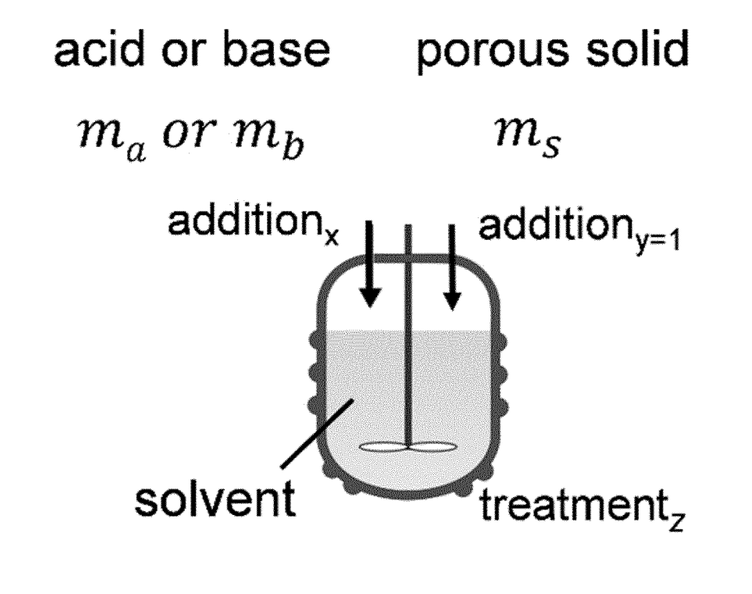
FIG. 1 depicts a general process overview to expose a porous solid to a number of treatments in acid or base. Conventionally, in a fixed volume of water, each treatment is executed by first adding a base or acid to the reactor, after which the porous solid is added and left to react under vigorous mechanical stirring.

In some embodiments, afterwards, the reactor is quenched, the solid filtered off (using a lab-scale Buchner set-up), and washed. FIG. 1 depicts a general process overview wherein conventionally the base and acid treatments are performed by first adding the base of acid to the reactor, after which the porous solid is added, followed by leaving the solid react in the acid or base solution under vigorous mechanical stirring. In FIG. 1, x represents the number of base or acid additions per reaction, $m_a$ the amount of acid added per addition, $m_b$ the amount of base added per addition, y the number of solid additions per reaction, $m_s$ the amount of solid added per addition, and z represents the number of treatments. In the state of the art, per treatment, x and y are usually equal to 1. In the further embodiments in this detailed description, y, and $m_s$ are not modified.

In order to highlight the value of the invention, it is essential to describe the state of the art in the experimental procedures of acid and alkaline leaching of solids. In the state of the art, a fixed amount of porous solid (typically 10-100 g $L^{-1}$), is contacted with an aqueous solution with a fixed alkalinity or acidity. This is achieved by a direct immersion of the solid in a heated solution, after which it is left to react, and to be recovered by filtration. The execution of individual acid treatments in a gradual fashion is known in the state of the art, as can be achieved using a pump or Soxhlet reactor. However, gradual acid treatments were never combined in any fashion with a gradual base treatment, which the inventors have found to be surprisingly effective.

Alkaline treatments are usually performed in solutions of NaOH or KOH (typically 0.2 M) at a temperature around 70 degrees C. for a time span of 30 min. Acid treatments are commonly executed using either mineral (for example HCl or $HNO_3$) or organic acids (for example citric acid or $H_4EDTA$). The concentration often depends on the aim of the acid treatment: when the dealumination of the framework is targeted, often more severe concentrations (for example, 2 M HCl) can be used. In contrast, the removal of Al-debris after an alkaline treatment is typically performed using a much milder treatment (using 0.1 M HCl).

In some embodiments of the invention, the acid or base is added, as solid or highly concentrated form, slowly during the course of the treatment. The inventors have found that this can be easily achieved using a pump, such as a syringe or peristaltic pump. On larger scales industrial pumps or solid dispersers may be used. Particularly in this embodiment, the efficiency of the use of TPABr or DEA to preserve the intrinsic zeolitic properties during is greatly enhanced.

In some embodiments, the method comprises the gradual contacting of a solid to an acid and a base using a continuous configuration. In this configuration, the porous solid can be located on a membrane and the (dilute) acidic or basic solution is contacted to it by flowing (f) it through the solid-covered membrane. On a lab scale such experiment may be performed using a continuous microfiltration set-up. This configuration holds no resemblance to the in-line synthesis as known, as in that work the base is pumped together with the solid, hence enabling it to react as in a plug flow, which yields the same materials as a batch reactor used in the prior art. However, if in the inline set up, the acid and base is added stepwise in the line, the solid and base no longer react as a batch reactor. Instead, it acts as described for the innovative process: the solid is stepwise contacted with the acid or base, yielding superior solids. In addition, the base or acid can be contacted with the zeolite in a continuous stirred-tank reactor, or any other configuration that enables a consecutive treatment of solids with acids or bases in a gradual or stepwise fashion.

In a second aspect, the invention relates to an inorganic porous solid obtainable by the method according to the first aspect, or any embodiment thereof. Preferred embodiments of these treated inorganic porous solids are as defined above.

In a third aspect, the invention relates to a zeolite with the faujasite topology, preferably prepared according to the method of the first aspect or any embodiment thereof, with a unit cell size ranging from 24.375 Å to 24.300 Å with a mesopore volume of at least 0.30 ml/g. Typically, the unit cell gets smaller when framework Al is removed. This type of zeolite is commonly referred to as an USY zeolite.

In some preferred embodiments, the zeolite according to the third aspect has a Brønsted acidity of at least 400 µmol $g^{-1}$, as measured with pyridine; preferably 425 µmol $g^{-1}$ or higher, and most preferably 500 µmol $g^{-1}$ or higher, as measured with pyridine.

In some preferred embodiments, the zeolite according to the third aspect has a crystallinity of at least 70%, preferably 75% or higher, and most preferably 80% or higher, relative to a standard NaY zeolite, and at least 80%, preferably 90% or higher, and most preferably 100% or higher, compared to NIST standard alumina (SRM 676).

In some preferred embodiments, the zeolite according to the third aspect has a microporosity of at least 0.18 ml $g^{-1}$, preferably 0.21 ml $g^{-1}$ or higher, and most preferably 0.24 ml $g^{-1}$ and higher.

In a fourth aspect, the invention relates to a zeolite with the faujasite topology, preferably prepared according to the method of the first aspect or any embodiment thereof, with a unit cell size ranging from 24.60 to 24.40 Å, preferably with a mesopore volume of at least 0.30 ml $g^{-1}$. This type of zeolite is commonly referred to as an Y zeolite.

In some preferred embodiments, the zeolite according to the fourth aspect has a bulk atomic Si/Al ratio of least 5, preferably 6 of higher, and more preferably 7 or higher.

In some preferred embodiments, the zeolite according to the fourth aspect has micropore volume of at least 0.18 ml $g^{-1}$, preferably 0.20 ml $g^{-1}$ or higher, and most preferably 0.22 ml $g^{-1}$ and higher.

In some preferred embodiments, the zeolite according to the fourth aspect has a crystallinity of at least 60%, preferably 70% or higher, and most preferably 80% or higher, relative to a standard NaY zeolite.

For industrial large-scale application, zeolite powders (as described in the examples) typically require to be transformed into technical catalysts. Technical catalysts are typically designed to provide the required mechanical strength and chemical stability to withstand demanding industrial catalytic unit operations. The transformation of a zeolite powder into a technical catalyst is preferably performed by mixing the zeolite with several other ingredients (such as fillers, pyrogens, binders, lubricants, etc.) and the subsequent shaping into macroscopic forms. The resulting technical catalysts can be multi-component bodies with sizes from the micrometre to the centimetre range.

In a sixth aspect, the invention relates to a method for preparing a technical catalyst, the method comprising the steps of:
- preparing a treated inorganic porous solid according to the first aspect of the invention, and preferred embodiments thereof;
- adding one or more additional ingredients to form a mixture, preferably wherein the one or more additional ingredients are selected from the group comprising: fillers, pyrogens, binders, lubricants, and combinations thereof; and
- shaping the mixture into a macroscopic form to obtain a technical catalyst, preferably wherein the macroscopic form has a minimal dimension from at least 1 μm to at most 10 cm.

The inventors have found that the solids as described above, particularly those of the second, third, fourth, and fifth aspects, as well as preferred embodiments thereof, are ideal intermediate compounds for the preparation of a technical catalyst as described above.

In a seventh aspect, the invention relates to the use of a treated inorganic porous solid according to any one of the aspects described herein or prepared in a method according to any one of the aspects, and embodiments thereof, in catalysis, adsorptive or ion exchange processes. Preferred embodiments of this use are as defined above.

Some embodiments of the invention are set forth below. These embodiments are also combinable with any of the embodiments described above.

In some embodiments the invention relates to a process of alkaline leaching of a porous solid whereby the method comprises a number of acid and base treatments (z) whereby the acid of base additions per reaction (x), an amount of base added per addition ($m_b$), a number of solid additions per reaction (y), an amount of solid added per addition ($m_s$), characterised in that x and z are not equal to 1.

In some embodiments, the process is so designed by controlling x, so that although the porous solid is subjected to a same overall amount of acid or base or that a same overall amount of acid or base is contacted with the porous solid (which is preferred to ensure the desired effect of the base or acid leaching), the alkaline or acid leaching is less drastic than subjecting the porous solid in a conventional direct manner to the same amount of acid or base. A conventional treatment could be a sequential base-acid treatment, in which the alkaline treatment would feature treating a porous solid at 10-100 g $L^{-1}$ in an aqueous solution contacted with a fixed alkalinity of 0.1 to 0.2 M NaOH, typically for about 20 to 40 min. This conventional treatment could be followed by a conventional acid treatment at 10-100 g L–1 in an aqueous solution with fixed acidity at 0.1-0.3 M HCl, typically for about 4-8 hours. Alternatively, the conventional treatment could be an acid-base sequence, where the conventional base treatment as described directly above is executed after an acid treatment at 10-100 g $L^{-1}$ in an aqueous solution of 0.15 M of $H_4EDTA$ typically for about 4-8 hours.

In some embodiments, the process is so designed that although the porous solid is subjected to a same overall amount of acid or base by controlling x, so that no fragmentation of components of the porous solid occurs.

In some embodiments, the process features an alkaline leaching on porous solid at 5 to 60 g $L^{-1}$, preferably 20 to 40 g $L^{-1}$, and whereby the process comprises subjecting the porous solid to a treatment regime several reaction of mild conditions of NaOH at a temperature between 40 to 70° C., preferably a temperature between 60 to 75° C. and a reaction time of 10 to 50 min, preferably 20 to 40 min whereby the treatment regime comprises z treatments of $m_b$ amounts of NaOH to have the same amount of NaOH consumed as one treatment of 0.15 to 0.25 M NaOH, and features in addition an acid leaching on porous solid at 5 to 100 g $L^{-1}$, preferably 50 to 80 g $L^{-1}$, and whereby the process comprises subjecting the porous solid to a treatment regime several reaction of mild conditions of HCl at a temperature between 40 to 100° C., preferably a temperature exceeding 80° C. and a reaction time of 1 to 10 hours, preferably 2 to 8 hours whereby the treatment regime comprises z treatments of $m_a$ amounts of HCl to have the same amount of HCl consumed as one treatment of 0.05 to 0.35 M NaOH.

In some embodiments, the porous solid is a porous silicate solid.

In some embodiments, the silicate solid is a material with a topology of the group consisting of MWW, BEA, MFI, CHA, MOR, MTW, RUB, LEV, FER, MEL, RTH AEL, AFI, CHA, DON, EMT, CFI, CLO, TON, FER, ERI, MEL, MTW, MWW, HEU, EUO, RHO, LTL, LTA and MAZ.

In some embodiments, the silicate solid is a material with a topology of the group consisting of MOR, MFI, BEA and FAU.

In some embodiments, the silicate solid is a porous crystalline silicate.

In some embodiments, the silicate solid is a porous crystalline silicate having zeolitic structure.

In some embodiments, the silicate solid is amorphous, such as fumed silica or silica gel. In some embodiments, the porous solid is an amorphous alumino-silicate.

In some embodiments, the silicate solid is a porous ordered silicate (e.g. MCM-41 or SBA-15).

In some embodiments, the porous solid is an ordered alumino-silicate (e.g. MCM-41).

In some embodiments, the porous solid is a porous amorphous (silico)aluminophosphate.

In some embodiments, the porous solid is a porous crystalline (silico)aluminophosphate (e.g. AlPO-5, SAPO-11, SAPO-34).

The efficiency of the base and acid leaching process is further enhanced (in term of generated mesoporosity and preserved crystallinity, microporosity, and acidity, in the resulting zeolites) by addition of salts to the acid or basic solution. These salts can have cations selected from the group of ammonium, primary, secondary, and tertiary amines, and quaternary alkyl ammonium ions, and the metal cations from the periodic Groups I, II, and III. The salts comprise anions selected from the group of chloride, bromide, nitrate, phosphate, sulfate, acetate, citrate, oxalate, tartrate, formate, malonate and succinate anions.

The beneficial effect of the salt is achieved by adding the salt during one or multiple acid or base treatments. The effect of the salt can be more enhanced after a subsequent treatment of different pH. This implies that the presence of salt can influence the efficiency of the treatment it is used in, as well as the efficiency of the following treatment. For clarity, the beneficial effect in the following treatment should not be ascribed to salts that may have remained in the solid during an incomplete wash, as the greater majority (>95%) of the salt is usually removed in the washing step after the first treatment. Instead several local changes in the solid may have occurred, which are hard to evidence directly after the treatment in which the salt was used. These local changes are likely preferentially altered in the following second treatment (often performed at different pH, e.g. acidic follows alkaline and vice versa).

For example, In the case of two treatments (z=2, acid-base), when the acid treatment is followed by the base treatment, the beneficial effect of addition of salt during the first acid treatment becomes more enhanced after the second base treatment (the latter executed in the absence of additional salts). Another example, in the case of 2 treatments (z=2, base-acid), when a base treatment is followed by an acid treatment, the presence of salt during the base treatment strongly influences the efficiency of the following acid treatment, even though no salt is present during the latter acid treatment.

EXAMPLES

Comparative Example 1

Base treatments were performed at 65° C. for 30 min in a stirred round-bottomed flask. Accordingly, 3.3 g of USY (CBV712 form Zeolyst) was suspended in 90 mL of water to which the base was added gradually ('G') during 30 min at a rate of 0.2 mmol of NaOH per gram of starting zeolite per min using a 2 M NaOH stock solution. After the reaction, the solid was isolated from the suspension using Buchner filtration.

Comparative Example 2

After the base treatment as described in Example 1, several grams of the obtained sample were exposed to 3 ion exchanges in 250 mL water complemented with $NH_4NO_3$ (0.8 g per gram of zeolite), followed by filtration, drying at 60° C. overnight, and calcination at 550° C. for 5 h.

Comparative Example 3

After the base treatment as described in Example 1, several gram were exposed to an subsequent acid treatment performed using 67 gram of zeolite per litre of 0.22 M solution of HCl at 95° C. for 6 h in a stirred round-bottomed flask. In this example, the zeolite was contacted with the acid in a direct ('D'), that is, non-gradual fashion. After the reaction, the solid was isolated from the suspension using Buchner filtration, and exposed to 3 ion exchanges in 250 mL water complemented with $NH_4NO_3$ (0.8 g per gram of zeolite), followed by filtration, drying at 60 C overnight, and calcination at 550° C. for 5 h.

Comparative Example 4

After the base treatment as described in Example 1, several gram were exposed to an additional acid treatment performed using 67 gram of zeolite per litre of 0.44 M solution of HCl at 95° C. for 6 h in a stirred round-bottomed flask. After the reaction, the solid was isolated from the suspension using Buchner filtration, and exposed to 3 ion exchanges in 250 mL water complemented with $NH_4NO_3$ (0.8 g per gram of zeolite), followed by filtration, drying at 60 C overnight, and calcination at 550° C. for 5 h.

Example 5

After a base treatment as described in Example 1, inventive acid treatments were performed at 95° C. for 6 h in a stirred round-bottomed flask. Accordingly, 2.7 g of base-treated USY was suspended in 40 mL of water to which the acid was added gradually during 6 h at a rate of 0.55 mmol of HCl per gram of starting zeolite per hour using a stock solution of 3.14 M HCl. After the reaction, the solid was isolated from the suspension using Buchner filtration, and exposed to 3 ion exchanges in 250 mL water complemented with $NH_4NO_3$ (0.8 g per gram of zeolite), followed by filtration, drying at 60° C. overnight, and calcination at 550° C. for 5 h. As illustrated in Table B, the intrinsic properties (microporosity, Brønsted acidity, crystallinity), the secondary porosity (mesoporosity), and the catalytic performance of this sample exceed substantially those related to sample prepared by the standard acid treatment using the same amount of acid per gram of zeolite (Example 3). This accordingly clearly highlights the benefits of executing both the base and the acid treatment in a gradual fashion.

Example 6

After the base treatment as described in Example 1, inventive acid treatments were performed at 95° C. for 6 h in a stirred round-bottomed flask. Accordingly, 2.7 g of base-treated USY was suspended in 40 mL of water to which the acid was added gradually during 6 h at a rate of 1.1 mmol of HCl per gram of starting zeolite per hour using a 3.14 M HCl stock solution. After the reaction, the solid was isolated from the suspension using Buchner filtration, and exposed to 3 ion exchanges in 250 mL water complemented with $NH_4NO_3$ (0.8 g per gram of zeolite), followed by filtration, drying overnight, and calcination at 550° C. for 5 h. As illustrated in Table B, the intrinsic properties (microporosity, Brønsted acidity, crystallinity), the secondary porosity (mesoporosity), and the catalytic performance of this sample exceed substantially those related to sample prepared by the standard acid treatment using the same amount of acid per gram of zeolite (Example 4). This accordingly clearly highlights the benefits of executing both the base and the acid treatment in a gradual fashion.

Table B illustrates the crystallinity, porosity, acidity, and catalytic performance of conventional, base-treated, and base-acid treated USY zeolites.

| Example # | Base (first) $m_{b,\,total}/m_s$ (g g$^{-1}$) | Acid (second) $m_{a,\,total}/m_s$ (g g$^{-1}$) | $V_{meso}{}^a$ ml g$^{-1}$ | $V_{micro}{}^a$ ml g$^{-1}$ | Cryst.[b] % | Acidity[c] μmol g$^{-1}$ | A[d] h$^{-1}$ | A[e] h$^{-1}$ |
|---|---|---|---|---|---|---|---|---|
| USY[h] | — | — | 0.18 | 0.25 | 100 | 270 | 15 | 3.3 |
| 2 | 0.24 (G)[g] | — | 0.31 (+72%)[f] | 0.24 (−4%) | 61 (−39%) | 313 (+16%) | 264 | 2.2 |
| 3 | 0.24 (G) | 0.12 (D) | 0.35 (+94%) | 0.22 (−12%) | 63 (−37%) | 325 (+19%) | 540 | 2.2 |
| 4 | 0.24 (G) | 0.24 (D) | 0.36 (+100%) | 0.20 (−20%) | 67 (−33%) | 267 (−1%) | 431 | 3.3 |

-continued

| Example # | Base (first) $m_{b,\,total}/m_s$ (g g$^{-1}$) | Acid (second) $m_{a,\,total}/m_s$ (g g$^{-1}$) | $V_{meso}{}^a$ ml g$^{-1}$ | $V_{micro}{}^a$ ml g$^{-1}$ | Cryst.$^b$ % | Acidity$^c$ μmol g$^{-1}$ | $A^d$ h$^{-1}$ | $A^e$ h$^{-1}$ |
|---|---|---|---|---|---|---|---|---|
| 5 | 0.24 (G) | 0.12 (G) | 0.38 (+111%) | 0.25 (0%) | 85 (−15%) | 427 (+58%) | 570 | 4.1 |
| 6 | 0.24 (G) | 0.24 (G) | 0.35 (+94%) | 0.26 (+4%) | 81 (−19%) | 494 (+83%) | 574 | 3.3 |

$^a$Nitrogen adsorption.
$^b$XRD, compared the parent USY zeolite ('conventional').
$^c$Pyridine.
$^d$Productivity of the catalyst in the conversion of a-pinene, in gram of useful products (limonene, camphene, α-terpinene, γ-terpinene, terpinoline, p-cymene) formed per gram of catalysts per hour.
$^e$Productivity of the catalyst in the alkylation of toluene with benzylalcohol expressed as g of benzylalcohol converted per gram of catalysts per hour.
$^f$values in brackets indicate the change induced compared to the starting conventional USY zeolite.
$^g$Letters within brackets in the columns 'Base' and 'Acid' indicate whether the treatment was executed in a gradual (G) or a non-gradual direct (D) fashion.
$^h$Commercial USY provided by Zeolyst (CBV 712).

Comparative Example 7

Several gram of a commercial NaY zeolite (CBV 100 from Zeolyst) were exposed to an acid treatment performed using 67 gram of zeolite per litre of 0.15 M of H$_4$EDTA at reflux for 6 h in a stirred round-bottomed flask. After the reaction, the solid was isolated from the suspension using Buchner filtration, washed, and dried.

Comparative Example 8

Several gram of a commercial NaY zeolite (CBV100 from Zeolyst) were exposed to an acid treatment performed using 67 gram of zeolite per litre by adding the equivalent amount of H$_4$EDTA as in Example 7 as solid in ten doses evenly spread during a 6 hour treatment at reflux in a stirred round-bottomed flask. After the reaction, the solid was isolated from the suspension using Buchner filtration, washed, and dried.

Comparative Example 9

The solid obtained in Example 7 was exposed to a subsequent base treatment. The latter was performed at 65° C. for 30 min in a stirred round-bottomed flask. Accordingly, 1.66 g of solid was suspended in 45 mL of water to which the base was added gradually during 30 min at a rate of 0.2 mmol of NaOH per gram of starting zeolite per min using a 2 M NaOH stock solution. After the reaction, the solid was isolated from the suspension using Buchner filtration, washing, and drying.

Example 10

The solid obtained in Example 8 was exposed to a subsequent base treatment. The latter was performed at 65° C. for 30 min in a stirred round-bottomed flask. Accordingly, 1.66 g of solid was suspended in 45 mL of water to which the base was added gradually during 30 min at a rate of 0.2 mmol of NaOH per gram of starting zeolite per min using a 2 M NaOH stock solution. After the reaction, the solid was isolated from the suspension using Buchner filtration, washing, and drying. As illustrated in Table C, the intrinsic properties (microporosity and crystallinity) and the secondary porosity (mesoporosity) of this sample exceed substantially those related to sample prepared by the standard acid treatment using the same amount of acid per gram of zeolite (Example 9). This accordingly clearly highlights the benefits of executing both the acid and the base treatment in a gradual fashion.

| Example # | Acid (first) $m_{a,\,total}/m_s$ (g g$^{-1}$) | Base (second) $m_{b,\,total}/m_s$ (g g$^{-1}$) | $V_{meso}{}^a$ ml g$^{-1}$ | $V_{micro}{}^a$ ml g$^{-1}$ | Crystallinity$^b$ % | Si/Al$^c$ mol mol$^{-1}$ |
|---|---|---|---|---|---|---|
| NaY$^e$ | — | — | 0.01 | 0.33 | 100 | 2.6 |
| 7 | 0.66 (D)$^d$ | — | 0.11 | 0.21 | 32 | — |
| 8 | 0.66 (G) | — | 0.09 | 0.29 | 46 | — |
| 9 | 0.66 (D) | 0.24 (G) | 0.41 | 0.15 | 25 | — |
| 10 | 0.66 (G) | 0.24 (G) | 0.52 | 0.23 | 78 | — |

$^a$Nitrogen adsorption.
$^b$XRD, compared the parent Y zeolite ('commercial').
$^c$ICP-OES.
$^d$Letters within brackets in the columns 'Acid' and 'Base' indicate whether the treatment was executed in a gradual (G) or a non-gradual direct (D) fashion.
$^e$Commercial NaY provided by Zeolyst (CBV 100).

Comparative Example 11

Conventional base leaching techniques Table A illustrates the physico-chemical properties of conventional (untreated) and acid and base-treated zeolites using a direct, e.g. non-gradual, exposure of the zeolite to the base or acid. Data is shown relative to the starting (untreated) zeolites.

| Zeolite | Modification sequence | Mesoporosity$^a$ (%) | Microporosity$^a$ (%) | Crystallinity$^a$ (%) | Brønsted acidity$^a$ (%) | Filtration time$^b$ (%) |
|---|---|---|---|---|---|---|
| Y | untreated | 100 | 100 | 100 | 100 | — |
| Y | first: acid (D)$^i$ second: base (D) third: acid (D) | 2100 | 61 | 51 | 52 | — |

| Zeolite | Modification sequence | Mesoporosity$^a$ (%) | Microporosity$^a$ (%) | Crystallinity$^a$ (%) | Brønsted acidity$^a$ (%) | Filtration time$^b$ (%) |
|---|---|---|---|---|---|---|
| USY$^d$ | untreated | 100 | 100 | 100 | 100 | 100 |
| USY | base (D) | 259 | 97 | 54 | 67 | 200 |
| USY-II$^e$ | untreated | 100 | 100 | 100 | 100 | 100 |
| USY-II | base (D) | 336 | 81 | 64 | 57 | 3400 |
| USY-III$^f$ | untreated | 100 | 100 | 100 | 100 | 100 |
| USY-III | base (D) | 296 | 78 | 76 | 93 | 4400 |
| ZSM-5$^g$ | untreated | 100 | 100 | 100 | 100 | 100 |
| ZSM-5 | base (D) | 700 | 57 | 72 | 84 | 600 |
| beta$^h$ | untreated | 100 | 100 | 100 | 100 | 100 |
| beta | base (D) | 313 | 90 | 61 | 76 | 500 |

$^a$Porosity, crystallinity, and acidity data were obtained from ACS Catalysis 2015, 5, 734.
$^b$Filtration times of the base treatments were obtained by reproduction of the experiments from ACS Catalysis 2015, 5, 734 on a 100 ml scale, and filtration using a Buchner set-up with Whatman filter #5 paper (9 cm in diameter). The filtration time of the non-treated conventional zeolites was obtained by filtration of a suspension of 3.3 g of zeolite in 100 ml distilled water using a Buchner set-up with Whatman filter #5 paper (9 cm in diameter).
$^d$CBV 712, Si/Al = 6.
$^e$CBV 720, Si/Al = 15.
$^f$CBV 760, Si/Al = 30.
$^g$CBV 8014, Si/Al = 40, Si/Al = 6.
$^h$TOSOH, HSZ-940HOA, Si/Al = 20.
$^i$The letters 'D' in the column 'Modification sequence' indicates that the treatments were executed in a non-gradual direct fashion.

The invention claimed is:

1. A method for the introduction of mesopore volume in a zeolite, the method comprising:
    subjecting a zeolite to a first treatment selected from a base treatment or an acid treatment, the zeolite having a faujasite topology and a unit cell size of at most 24.70 Å;
    performing a first solid separation after the first treatment to obtain a once treated zeolite;
    subjecting the once treated zeolite to a second treatment selected from a base treatment or an acid treatment;
    performing a second solid separation after the second treatment to obtain a twice treated zeolite;
    optionally subjecting the twice treated zeolite to a third treatment selected from a base treatment or an acid treatment, then performing a third solid separation after the third treatment to obtain a thrice treated zeolite; and
    obtaining after the second solid separation or, if applicable, the third solid separation, a final zeolite having 0.05 mL/g or more of mesopore volume,
wherein:
    at least one of the first treatment, the second treatment, and the optional third treatment is a base treatment;
    at least one of the first treatment, the second treatment, and the optional third treatment is an acid treatment;
    each base treatment comprises:
        (a) providing a total mass of a faujasite for the base treatment, the faujasite being selected from the zeolite, the once treated zeolite, or the twice treated zeolite;
        (b) providing a total number of moles of a base in the form of a solid alkali or an alkaline solution; and
        (c) contacting and reacting the total mass of the faujasite with the total number of moles of the base in an aqueous solution with a pH from 10 to 14 at a temperature from room temperature to 100° C., such that:
            the total number of moles of base is added to the faujasite over a period of at least 15 seconds; and
            a maximum number of moles of the base that is brought into contact with the faujasite at any given time during the base treatment is less than the total number of moles of the base divided by the total mass of the faujasite and is also less than 0.25 times the total number of moles of the base;
    each acid treatment comprises:
        (d) providing a total mass of a faujasite for the base treatment, the faujasite being selected from the zeolite, the once treated zeolite, or the twice treated zeolite;
        (e) providing a total number of moles of an acid in the form of a solid acid or an acidic solution; and
        (f) contacting and reacting the total mass of the faujasite with the total number of moles of the acid in an aqueous solution with a pH from 0 to 5 at a temperature from room temperature to 100° C., such that:
            the total number of moles of acid is added to the faujasite over a period of at least 15 minutes; and
            a maximum number of moles of the acid that is brought into contact with the faujasite at any given time during the acid treatment is less than the total number of moles of the acid divided by the total mass of the faujasite and is also less than 0.25 times the total number of moles of the acid.

2. The method of claim 1, further comprising adding a salt additive during (c) of the base treatment, during (f) of the acid treatment, or both, the salt additive being selected from the group consisting of NaCl, KBr, Al(NO$_3$)$_3$, Ga(NO$_3$)$_3$, tetrapropylammonium bromide (TPABr), diethylamine (DEA), and combinations thereof.

3. The method of claim 1, further comprising adding a salt additive during (c) of the base treatment, during (f) of the acid treatment, or both, the salt additive comprising at least one cation selected from the group consisting of ammonium, primary amines, secondary amines, tertiary amines, quaternary alkyl ammonium, and metal cations from Groups I, II, or III of the periodic table.

4. The method of claim 1, further comprising adding a salt additive during (c) of the base treatment, during (f) of the acid treatment, or both, the salt additive comprising at least one anion selected from the group consisting of chloride, bromide, nitrate, phosphate, sulfate, acetate, citrate, oxalate, tartrate, formate, malonate, and succinate.

5. The method of claim 1, wherein the first treatment is a base treatment and the second treatment is an acid treatment.

6. The method of claim 1, wherein the first treatment is an acid treatment and the second treatment is a base treatment.

7. The method of claim 1, wherein during (c) of the base treatment, the maximum amount of the base that is brought into contact with the faujasite at any given time during the base treatment is at most 0.10 times the total number of moles of the base.

8. The method of claim 1, wherein:
in (a) of the base treatment, providing the total mass of the faujasite comprises providing the faujasite suspended in water; and
in (d) of the base treatment, providing the total mass of the faujasite comprises providing the faujasite suspended in water.

9. The method of claim 1, wherein the base in the base treatment is selected from the group consisting of $NH_4OH$, NaOH, KOH, LiOH, tetrapropylammonium hydroxide, diethylamine, dipropylamine, tetrabutylammonium hydroxide, tetraethylammonium hydroxide, and combinations thereof.

10. The method of claim 1, wherein the acid in the acid treatment is selected from the group consisting of HCl, $HNO_3$, $H_2SO_4$, $H_3PO_4$, $H_3BO_3$, oxalic acid, citric acid, acetic acid, benzoic acid, formic acid, ethylenediaminetetraacetic acid ($H_4EDTA$), disodium ethylenediaminetetraacetic acid ($Na_2H_2EDTA$), and combinations thereof.

11. The method of claim 1, wherein:
in (c) of the base treatment, the total number of moles of base is added as at least two separate base additions not separated by a solid separation step; and
in (f) of the acid treatment, the total number of moles of acid is added as at least two separate acid additions not separated by a solid separation step.

12. The method of claim 1, wherein:
the final zeolite is obtained after the second solid separation;
the zeolite is a Y zeolite having a unit cell size of from 24.50 Å to 24.70 Å;
the first treatment is an acid treatment; and
the second treatment is a base treatment.

13. The method of claim 1, wherein:
the final zeolite is obtained after the second solid separation;
the zeolite is a USY zeolite having a unit cell size of from 24.300 Å to 24.375 Å;
the first treatment is a base treatment; and
the second treatment is an acid treatment.

14. The method of claim 1, wherein:
the twice treated zeolite is subjected to the third treatment followed by the third solid separation after the third treatment to obtain a thrice treated zeolite;
the final zeolite is obtained after the third solid separation;
the untreated faujasite is a Y zeolite having a unit cell size of from 24.50 Å to 24.70 Å;
the first treatment is an acid treatment;
the second treatment is a base treatment; and
the third treatment is an acid treatment.

15. The method of claim 1, wherein, in (c) of the base treatment, the base is added to the faujasite such that a rate of addition of the base over the period of at least 15 seconds is at most 3.0 mmol of base per gram of faujasite per minute.

16. The method of claim 1, wherein:
in (c) of the base treatment, the base is continuously added to the faujasite over the period of at least 15 seconds; and
in (f) of the acid treatment, the acid is continuously added to the faujasite over the period of at least 15 min.

17. A final zeolite prepared according to the method of claim 1, the final zeolite having:
a faujasite topology,
a unit cell size from 24.300 Å to 24.375 Å;
a mesopore volume of at least 0.30 mL/g; and
at least one of the following features:
a Brønsted acidity of at least 450 $\mu mol\ g^{-1}$, as measured with pyridine; and
a crystallinity of at least 75% relative to industrial standard NaY zeolite Zeolyst CBV 100; and
a crystallinity of at least 90% compared to NIST standard alumina (SRM 676).

18. A final zeolite prepared according to the method of claim 1, the final zeolite having:
a faujasite topology;
a unit cell size of from 24.40 Å to 24.60 Å;
a bulk atomic Si/Al ratio greater than 7.5;
a mesopore volume of at least 0.30 mL/g; and
a micropore volume of at least 0.20 mL/g.

* * * * *

UNITED STATES PATENT AND TRADEMARK OFFICE
CERTIFICATE OF CORRECTION

PATENT NO. : 11,325,835 B2
APPLICATION NO. : 16/635355
DATED : May 10, 2022
INVENTOR(S) : Danny Verboekend, Bert F. Sels and Martin A. D'Halluin It is certified that error appears in the above-identified patent and that said Letters Patent is hereby corrected as shown below:

In the Specification

In Column 4, Line(s) 57, delete "0" and insert --1--, therefor.

In Column 11, Line(s) 7, delete "a-pinene" and insert --α-pinene--, therefor.

In Column 11, Line(s) 38, after "amount of", insert --acid--.

In Column 21, Line(s) 4, delete "a-pinene" and insert --α-pinene--, therefor.

Signed and Sealed this
Eleventh Day of October, 2022

Katherine Kelly Vidal
*Director of the United States Patent and Trademark Office*